US008655558B2

(12) United States Patent
Kawasaki et al.

(10) Patent No.: US 8,655,558 B2
(45) Date of Patent: Feb. 18, 2014

(54) CONTROL SYSTEM FOR HYBRID CONSTRUCTION MACHINE

(75) Inventors: Haruhiko Kawasaki, Atsugi (JP); Masahiro Egawa, Kawaguchi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/512,863

(22) PCT Filed: Feb. 2, 2011

(86) PCT No.: PCT/JP2011/052494
§ 371 (c)(1),
(2), (4) Date: May 30, 2012

(87) PCT Pub. No.: WO2011/099437
PCT Pub. Date: Aug. 18, 2011

(65) Prior Publication Data
US 2012/0245782 A1    Sep. 27, 2012

(30) Foreign Application Priority Data

Feb. 12, 2010   (JP) .................................. 2010-029345
Mar. 26, 2010   (JP) .................................. 2010-072560

(51) Int. Cl.
  *E02F 3/76*  (2006.01)
(52) U.S. Cl.
  USPC .................. 701/50; 701/22; 701/36; 172/23; 172/105; 172/114; 172/239
(58) Field of Classification Search
  CPC ........ B60K 16/00; B60K 17/00; B60K 20/00; B60K 23/00; B60L 9/00; A01B 13/00; E02F 9/00; E02F 3/76; G05D 1/00; G05D 3/00; G06F 7/00
  USPC ........ 701/22, 36, 50, 78, 83, 85; 172/23, 105, 172/114, 171, 239, 280; 37/234, 812
  See application file for complete search history.

(56) References Cited

U.S. PATENT DOCUMENTS

| | | | |
|---|---|---|---|
| 2002/0138188 A1* | 9/2002 | Watanabe et al. | 701/50 |
| 2004/0088103 A1* | 5/2004 | Itow et al. | 701/110 |
| 2005/0001606 A1* | 1/2005 | Kagoshima | 323/371 |
| 2008/0059021 A1* | 3/2008 | Lu et al. | 701/36 |
| 2008/0071438 A1* | 3/2008 | Nasr et al. | 701/22 |
| 2008/0300757 A1* | 12/2008 | Kanayama et al. | 701/50 |
| 2009/0095549 A1* | 4/2009 | Dalum et al. | 180/65.265 |
| 2009/0139781 A1* | 6/2009 | Straubel | 180/65.1 |
| 2009/0222158 A1* | 9/2009 | Kubota et al. | 701/22 |
| 2011/0276212 A1* | 11/2011 | Wu | 701/22 |

FOREIGN PATENT DOCUMENTS

| | | |
|---|---|---|
| JP | 09-329086 A | 12/1997 |
| JP | 2001-003397 | 1/2001 |
| JP | 2005-81973 | 3/2005 |
| JP | 2007-262978 A | 10/2007 |
| JP | 2007-327527 A | 12/2007 |
| JP | 2008-057687 A | 3/2008 |
| JP | 2009-235717 A | 10/2009 |
| JP | 2009-236191 A | 10/2009 |

* cited by examiner

*Primary Examiner* — Mary Cheung
*Assistant Examiner* — Atul Trivedi
(74) *Attorney, Agent, or Firm* — Rabin & Berdo, P.C.

(57) ABSTRACT

A controller is connected to a pressure sensor. The controller controls a regulator of a sub-pump in accordance with a pressure signal from the pressure sensor, detects an output of a main pump, and controls an output of an electric motor according to the output of the main pump based on a table stored beforehand.

5 Claims, 3 Drawing Sheets

CONTROL SYSTEM FOR HYBRID CONSTRUCTION MACHINE

TECHNICAL FIELD

This invention relates to a control system for hybrid construction machine including a sub-pump which is rotated by a drive force of an electric motor.

BACKGROUND ART

JP2009-235717A discloses a control system for hybrid construction machine.

In this conventional control system, oil discharged from a variable-capacity sub-pump is joined at a discharge side of a variable-capacity main pump and the sub-pump is driven by an electric motor. A tilting angle of the main pump is controlled by the action of a pilot pressure generated according to an operated amount of a control valve.

An assist force of the sub-pump for the main pump is set beforehand so as to be most efficient in response to the pilot pressure.

SUMMARY OF INVENTION

In this conventional control system, the assist force of the sub-pump corresponds to the pilot pressure of the main pump. However, since being set beforehand, this assist force does not change even if a working state such as light work and heavy work changes. Therefore, an assist pump gives an output more than necessary even at the time of light work, whereby battery consumption increases.

Since the electric motor is driven by power of a battery and the life of the battery is proportional to a cumulative amount of consumed power, if power is consumed more than necessary at the time of light work, the life of the battery is shortened by that much.

This invention aims to control an output of an electric motor as a drive source for a sub-pump according to a working state such as light work and heavy work to reduce battery consumption and extend the life of a battery in a control system for hybrid construction machine.

One aspect of the present invention is directed to a control system for hybrid construction machine, including a variable-capacity main pump; a circuit system which is connected to the main pump and includes a plurality of control valves; a regulator which controls a tilting angle of the main pump; a pilot flow path which is provided in the circuit system and introduces a pilot pressure generated when any one of the plurality of control valves is switched to the regulator; an electric motor; a variable-capacity sub-pump which is connected to a discharge side of the main pump and driven by an output of the electric motor; a regulator which is provided in the sub-pump and controls a tilting angle of the sub-pump; a pressure sensor which is provided in the pilot flow path and detects the pilot pressure; and a controller which is connected to the pressure sensor, controls the regulator of the sub-pump in accordance with a pressure signal from the pressure sensor, detects an output of the main pump and controls the output of the electric motor according to the output of the main pump based on a table stored beforehand.

According to the above aspect, an assist force of the electric motor can be controlled, for example, according to a working state such light work or heavy work. Thus, an assist force more than necessary is not exercised at the time of light work and battery consumption is reduced by that much.

Since the output of the electric motor can be relatively reduced at the time of light work, it is also possible to extend the life of a battery.

An embodiment of the present invention and advantages thereof are described in detail below with reference to the accompanying drawings.

EMBODIMENT OF INVENTION

Figure 1:
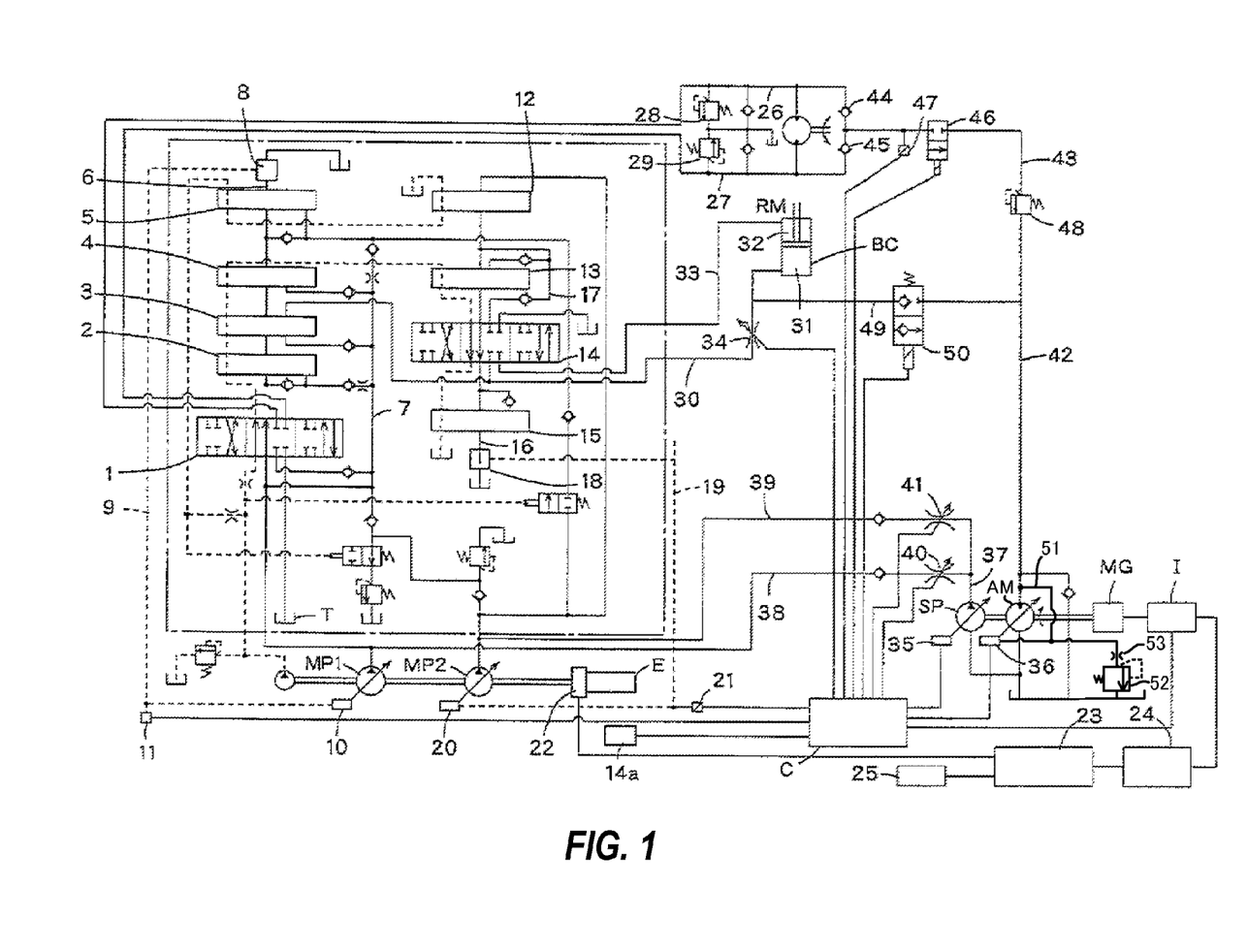
FIG. 1 is a hydraulic circuit diagram showing an embodiment of the present invention.

An embodiment shown in FIG. 1 is a control system for a power shovel. The control system includes variable-capacity first and second main pumps MP1, MP2. A first circuit system is connected to the first main pump MP1, and a second circuit system is connected to the second main pump MP2.

To the first circuit system are connected a control valve 1 for controlling a rotation motor RM, a control valve 2 for controlling an unillustrated arm cylinder, a control valve 3 for controlling a boom cylinder BC, a control valve 4 for controlling an unillustrated auxiliary attachment and a control valve 5 for controlling an unillustrated left travel motor in this order from an upstream side.

The respective control valves 1 to 5 are connected to the first main pump MP1 via a neutral flow path 6 and a parallel passage 7.

A pilot pressure generating mechanism 8 is provided downstream of the control valve 5 in the neutral flow path 6. The pilot pressure generating mechanism 8 generates a high pilot pressure if a flow rate therethrough is high while generating a low pilot pressure if the flow rate is low.

The neutral flow path 6 introduces all or part of fluid discharged from the first main pump MP1 to a tank T when all the control valves 1 to 5 are at or near neutral positions. In this case, a high pilot pressure is generated since the flow rate through the pilot pressure generating mechanism 8 is also high.

If the control valves 1 to 5 are switched to full-stroke states, the neutral flow path 6 is closed and fluid does not flow any longer. In this case, the flow rate through the pilot pressure generating mechanism 8 is almost zero and the pilot pressure is kept at zero.

However, depending on the operated amounts of the control valves 1 to 5, part of pump-discharged amount is introduced to an actuator and part of it is introduced to the tank T from the neutral flow path 6. Thus, the pilot pressure generating mechanism 8 generates a pilot pressure corresponding to the flow rate in the neutral flow path 6. In other words, the pilot pressure generating mechanism 8 generates the pilot pressure corresponding to the operated amounts of the control valves 1 to 5.

A pilot flow path 9 is connected to the pilot pressure generating mechanism 8. The pilot flow path 9 is connected to a regulator 10 for controlling a tilting angle of the first main pump MP1. The regulator 10 controls the discharge amount of the first main pump MP1 in inverse proportion to a pilot pressure. The discharge amount of the first main pump MP1 is kept maximum when the control valves 1 to 5 are set to the full stroke states so that the flow in the neutral flow path 6 becomes zero, in other words, when the pilot pressure generated by the pilot pressure generating mechanism 8 becomes zero.

A first pressure sensor 11 is connected to the pilot flow path 9. A pressure signal detected by the first pressure sensor 11 is input to a controller C.

To the second circuit system are connected a control valve 12 for controlling an unillustrated right travel motor, a control valve 13 for controlling an unillustrated bucket cylinder, a control valve 14 for controlling the boom cylinder BC, and a control valve 15 for controlling the unillustrated arm cylinder in this order from an upstream side. A sensor 14a for detecting an operating direction and an operated amount of the control valve 14 is provided in the control valve 14.

The respective control valves 12 to 15 are connected to the second main pump MP2 via a neutral flow path 16. The control valve 13 and the control valve 14 are connected to the second main pump MP2 via a parallel passage 17.

A pilot pressure generating mechanism 18 is provided downstream of the control valve 15 in the neutral flow path 16. The pilot pressure generating mechanism 18 functions in just the same manner as the pilot pressure generating mechanism 8.

A pilot flow path 19 is connected to the pilot pressure generating mechanism 18. The pilot flow path 19 is connected to a regulator 20 for controlling a tilting angle of the second main pump MP2. The regulator 20 controls the discharge amount of the second main pump MP2 in inverse proportion to a pilot pressure. Accordingly, the discharge amount of the second main pump MP2 is kept maximum when the control valves 12 to 15 are set to the full stroke states so that the flow in the neutral flow path 16 becomes zero, in other words, when the pilot pressure generated by the pilot pressure generating mechanism 18 becomes zero.

A second pressure sensor 21 is connected to the pilot flow path 19. A pressure signal detected by the second pressure sensor 21 is input to the controller C.

The first and second main pumps MP1, MP2 are coaxially rotated by a drive force of one engine E. The engine E includes a generator 22. The generator 22 is rotated by excess power of the engine E to generate power. Power generated by the generator 22 is charged into a battery 24 via a battery charger 23.

The battery charger 23 can charge the battery 24 with power also when being connected to a normal household power supply 25. That is, the battery charger 23 is also connectable to another independent power supply.

Passages 26, 27 communicating with the rotation motor RM are connected to an actuator port of the control valve 1 connected to the first circuit system. Brake valves 28, 29 are respectively connected to the both passages 26, 27. When the control valve 1 is kept at the shown neutral position, the actuator port is closed and the rotation motor RM remains stopped.

If the control valve 1 is switched, for example, to a right position in FIG. 1 from the above state, one passage 26 is connected to the first main pump MP1 and the other passage 27 communicates with the tank T. Accordingly, the rotation motor RM rotates by having pressure fluid supplied from the passage 26, and return fluid from the rotation motor RM is returned to the tank T via the passage 27.

If the control valve 1 is, conversely, switched to a left position, then pump-discharged fluid is supplied to the passage 27, the passage 26 communicates with the tank T, and the rotation motor RM rotates in a reverse direction.

When the rotation motor RM is driven, the brake valve 28 or 29 functions as a relief valve. When pressures in the passages 26, 27 increase to set pressures or higher, the brake valves 28, 29 are opened to introduce fluid at a high-pressure side to a low-pressure side. If the control valve 1 is returned to the neutral position while the rotation motor RM is being rotated, the actuator port of the control valve 1 is closed. Even if the actuator port of the control valve 1 is closed, the rotation motor RM continues to rotate due to inertial energy thereof. By rotating due to inertial energy, the rotation motor RM functions as a pump. In this case, a closed circuit is formed by the passages 26, 27, the rotation motor RM and the brake valve 28 or 29, and the inertial energy is converted into thermal energy by the brake valve 28 or 29.

If the control valve 14 is switched to a right position in FIG. 1 from the neutral position, pressure fluid from the second main pump MP2 is supplied to a piston-side chamber 31 of the boom cylinder BC via a passage 30. Return fluid from a rod-side chamber 32 is returned to the tank T via a passage 33, whereby the boom cylinder BC extends.

On the contrary, if the control valve 14 is switched to a left position in FIG. 1, pressure fluid from the second main pump MP2 is supplied to the rod-side chamber 32 of the boom cylinder BC via the passage 33. Return fluid from the piston-side chamber 31 is returned to the tank T via the passage 30, whereby the boom cylinder BC contracts. The control valve 3 is switched in association with the control valve 14.

A proportional electromagnetic valve 34, the opening of which is controlled by the controller C, is provided in the passage 30 connecting the piston-side chamber 31 of the boom cylinder BC and the control valve 14. The proportional electromagnetic valve 34 is kept at a fully open position in a normal state.

Next, a variable-capacity sub-pump SP for assisting outputs of the first and second main pumps MP1, MP2 is described.

The sub-pump SP is rotated by a drive force of an electric motor MG doubling as a generator. A variable-capacity assist motor AM is also coaxially rotated by the drive force of the electric motor MG. An inverter I is connected to the electric motor MG. The controller C is connected to the inverter I and the rotation speed of the electric motor MG and the like can be controlled by the controller C.

Titling angles of the sub-pump SP and the assist motor AM are controlled by regulators 35, 36. The regulators 35, 36 are controlled by output signals of the controller C.

A discharge passage 37 is connected to the sub-pump SP. The discharge passage 37 is branched off to a first joint passage 38 which joins at a discharge side of the first main pump MP1 and a second joint passage 39 which joins at a discharge side of the second main pump MP2. First and second proportional electromagnetic throttle valves 40, 41, the openings of which are controlled by output signals of the controller C, are provided in the respective first and second joint passages 38, 39.

A connection passage 42 is connected to the assist motor AM. The connection passage 42 is connected to the passages 26, 27 connected to the rotation motor RM via the joint passage 43 and check valves 44, 45. An electromagnetic switching valve 46, the opening and closing of which are controlled by the controller C, is provided in the joint passage 43. A pressure sensor 47 for detecting a pressure at the time of rotating the rotation motor RM or a pressure at the time of braking is provided between the electromagnetic switching valve 46 and the check valves 44, 45. A pressure signal of the pressure sensor 47 is input to the controller C.

In the joint passage 43, a safety valve 48 is provided at a position downstream of the electromagnetic switching valve 46 with respect to a flow from the rotation motor RM to the connection passage 42. The safety valve 48 prevents runaway of the rotation motor RM by maintaining the pressures in the passages 26, 27 when there is a failure in the connection passage 42, the joint passage 43 and the like such as a failure of the electromagnetic switching valve 46.

A passage 49 communicating with the connection passage 42 is provided between the boom cylinder BC and the proportional electromagnetic valve 34. An electromagnetic on-off valve 50 controlled by the controller C is provided in the passage 49.

The passage 42 includes a passage 51 communicating with the regulator 36 for controlling the tilting angle of the assist motor AM. A relief valve 52 is provided in the passage 51. A throttle 53 is provided upstream of the relief valve 52.

Figure 2:
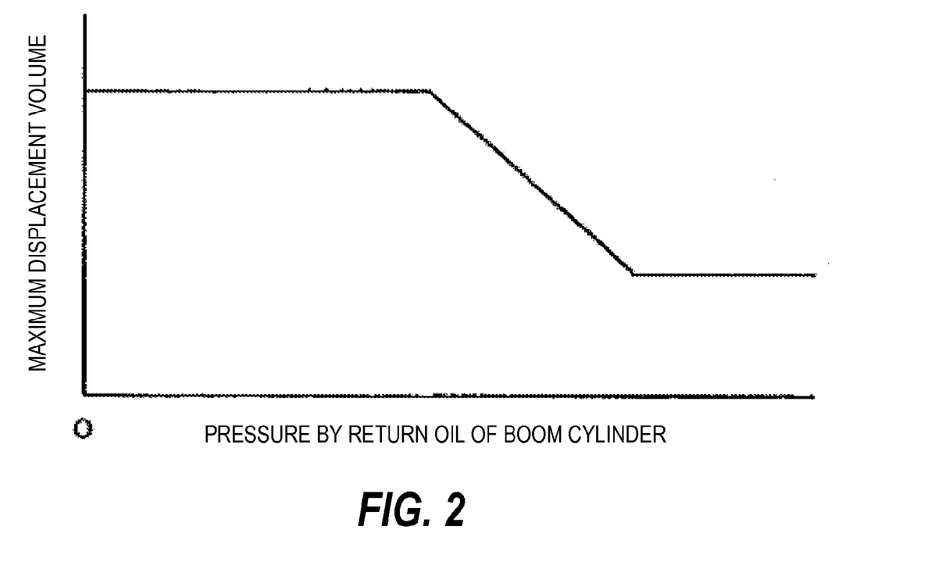
FIG. 2 is a graph showing a relationship between displacement volume of an assist motor and pressure by return oil of a boom cylinder.

The regulator 36 communicating with the passage 42 reduces a displacement volume D per rotation as shown in FIG. 2, for example, when a pressure produced by the return oil from the boom cylinder BC introduced into the passage 42 increases. Accordingly, if a torque T acting on the assist motor AM is assumed to be $T=(D \cdot P)/2\pi$, the regulator 36 keeps the torque T at or below an electric motor absorption torque by reducing the displacement volume D when a pressure P increases.

By providing the throttle 53 upstream of the relief valve 52, a pressure override of the relief valve 52 is substantially worsened. The pressure override is substantially worsened to gradually increase a relief flow rate as shown by solid line in FIG. 3. That is, when the pressure produced by the return oil from the boom cylinder BC increases in the connection passage 42, the boom cylinder BC cannot be stopped without causing any sense of incongruity if the relief valve 52 increases the relief flow rate at once as shown by broken line in FIG. 3.

In this embodiment, the assist flow rate of the sub-pump SP is set beforehand in accordance with pressure signals of the first and second pressure sensors 11, 21 and the controller C judges how the tilting angle of the sub-pump SP, that of the assist motor AM, the rotation speed of the electric motor MG and the like can be most efficiently controlled and controls the respective parts.

The controller C of this embodiment detects outputs of the first and second main pumps MP1, MP2 and estimates whether the operation is being performed in a light working state or a heavy working state from the states of outputs.

That is, the controller C estimates the outputs of the first and second main pumps MP1, MP2 from the discharge pressures and discharge flow rates thereof. The discharge amounts of the first and second main pumps MP1, MP2 may be directly measured by unillustrated flow rate detectors, but may be inferred from the displacement volumes per rotation of the first and second main pumps MP1, MP2 and the rotation speeds thereof at that time.

Figure 4:
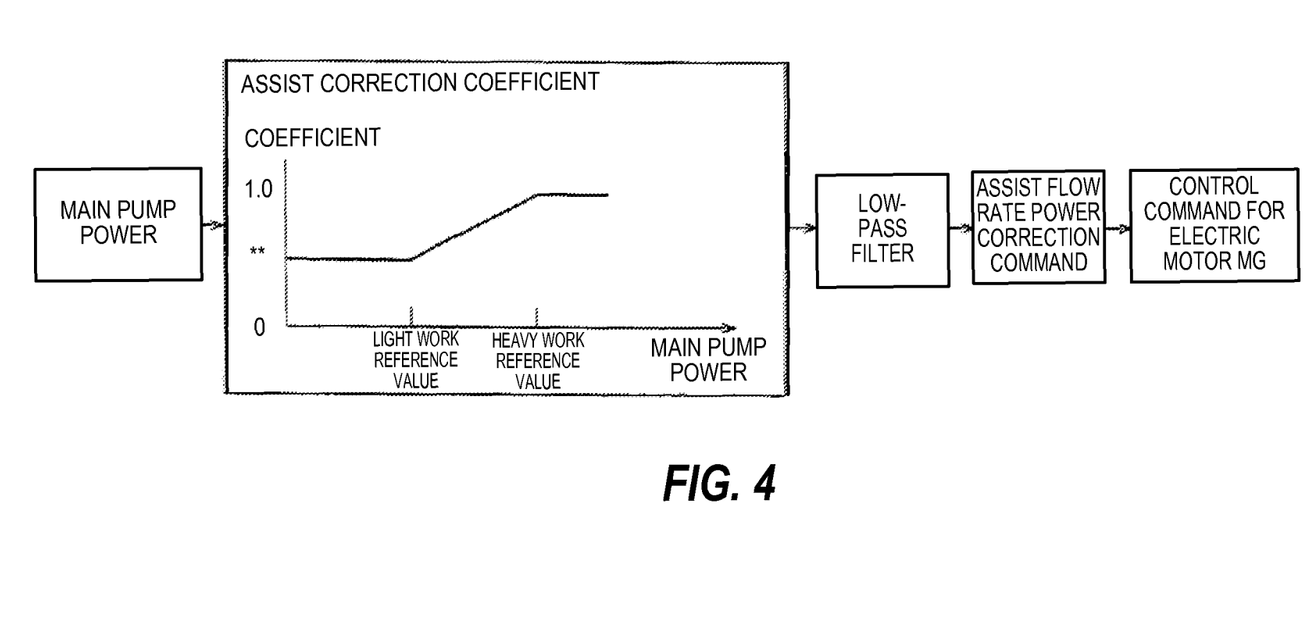
FIG. 4 is a flow chart showing control contents of a controller.

Further, a table shown in FIG. 4 is stored beforehand in the controller C. This table is composed of data on assist correction coefficients corresponding to the outputs of the first and second main pumps MP1, MP2. The assist correction coefficient is 1 in the case of a heavy working state while being below 1 in the case of a light working state.

The controller C estimates the outputs of the first and second main pumps MP1, MP2, specifies an assist correction coefficient corresponding to the values of the outputs, and calculates an assist flow rate power correction command value by filtering the assist correction coefficient by a low-pass filter. Then, the controller C controls the output (for example, the output power) of the electric motor MG, which drives the sub-pump SP, based on the assist flow rate power correction command value.

Since the outputs of the first and second main pumps MP1, MP2 largely vary depending on the content of work such as excavation work, a correction command is issued after suppressing output variations of the first and second main pumps MP1, MP2 by the low-pass filter and a control is executed while a sudden change of the electric motor MG is suppressed.

If the control valves 1 to 5 of the first circuit system are kept at the neutral positions, all the fluid discharged from the first main pump MP1 is introduced to the tank T via the neutral flow path 6 and the pilot pressure generating mechanism 8. If all the fluid discharged from the first main pump MP flows through the pilot pressure generating mechanism 8, a pilot pressure generated there becomes higher and a relatively high pilot pressure is also introduced to the pilot flow path 9. The regulator 10 operates by the action of the high pilot pressure introduced to the pilot flow path 9 to keep the discharge amount of the first main pump MP1 minimum. A pressure signal indicating the high pilot pressure at this time is input to the controller C from the first pressure sensor 11.

Also when the control valves 12 to 15 of the second circuit system are kept at the neutral positions, the pilot pressure generating mechanism 18 generates a relatively high pilot pressure as in the case of the first circuit system and this high pressure acts on the regulator 20 to keep the discharge amount of the second main pump MP2 minimum. A pressure signal indicating the high pilot pressure at this time is input to the controller C from the second pressure sensor 21.

When pressure signals indicating relatively high pressures are input from the first and second pressure sensors 11, 21 to the controller C, the controller C judges that the first and second main pumps MP1, MP2 maintain minimum discharge amounts and controls the regulators 35, 36 to zero or minimize the tilting angles of the sub-pump SP and the assist motor AM.

When receiving signals indicating that the discharge amounts of the first and second main pumps MP1, MP2 are minimum, the controller C may stop the rotation of the electric motor MG or may keep it rotating.

In the case of stopping the rotation of the electric motor MG, there is an effect of saving power consumption. In the case of keeping the electric motor MG rotating, the sub-pump SP and the assist motor AM also keep rotating. Thus, there is an effect of reducing a shock at the time of starting the sub-pump SP and the assist motor AM. In any case, whether to stop the electric motor MG or to keep it rotating is determined according to the intended purpose and usage of the construction machine.

If any one of the control valves of the first and second circuit systems is switched in the above state, the flow rate in the neutral flow path 6 or 16 decreases according to the operated amount and the pilot pressure generated in the pilot pressure generating mechanism 8 or 18 accordingly decreases. If the pilot pressure decreases, the tilting angle of the first or second main pump MP1 or MP2 accordingly increases to increase the discharge amount.

In the case of increasing the discharge amount of the first or second main pump MP1 or MP2, the controller C keeps the electric motor MG in a constantly rotating state. That is, if the electric motor MG stops when the discharge amounts of the first and second main pumps MP1, MP2 are minimum, the controller C detects a decrease in the pilot pressure and restarts the electric motor MG.

In this case, the controller C calculates a total output of the first and second main pumps MP1, MP2 and determines whether the total output is higher or lower than a reference value. It is determined that the first and second main pumps MP1, MP2 are driven in a light working state if the total output is lower than a light work reference value, it is determined that they are driven in a heavy working state if the total output is higher than a heavy work reference value, and it is determined that they are driven in an intermediate state if work is between light work and heavy work.

The controller C calculates an assist flow rate power correction command value corresponding to each working state and controls the output of the electric motor MG based on the assist flow rate power correction command value.

Accordingly, the controller C drives the electric motor MG by multiplying a command for the electric motor MG by a correction coefficient=1 in heavy work. In light work, the controller C drives the electric motor MG by multiplying the command by a correction coefficient set beforehand and smaller than that at the time of heavy work. In an intermediate range between light work and heavy work, the controller C drives the electric motor MG by multiplying the command by a correction coefficient between the small correction coefficient set beforehand and the correction coefficient=1.

The controller C controls the openings of the first and second proportional electromagnetic throttle valves 40, 41 in accordance with the pressure signals of the first and second pressure sensors 11, 21 and proportionally distributes the discharge amount of the sub-pump SP to supply it to the first and second circuit systems.

Since the controller C can control the tilting angle of the sub-pump SP and the openings of the first and second proportional electromagnetic throttle valves 40, 41 only by the pressure signals of the two first and second pressure sensors 11, 21, the number of the pressure sensors can be reduced.

If the control valve 1 is switched to either left or right, e.g. to the right position in FIG. 1 to drive the rotation motor RM connected to the first circuit system, the one passage 26 communicates with the first main pump MP1 and the other passage 27 communicates with the tank T to rotate the rotation motor RM. In this case, a rotation pressure is kept at a set pressure of the brake valve 28. If the control valve 1 is switched to left in FIG. 1, the other passage 27 communicates with the first main pump MP1 and the one passage 26 communicates with the tank T to rotate the rotation motor RM. Also in this case, a rotation pressure is kept at a set pressure of the brake valve 29.

If the control valve 1 is switched to the neutral position during the rotation of the rotation motor RM, a closed circuit is formed between the passages 26 and 27 and the brake valve 28 or 29 maintains a brake pressure of the closed circuit to convert inertial energy into thermal energy.

The pressure sensor 47 detects the rotation pressure or the brake pressure and a pressure signal thereof is input to the controller C. The controller C switches the electromagnetic switching valve 46 from a closed position to an open position in the case of detecting a pressure which is within such a range as not to affect the rotation of the rotation motor RM or a braking operation and lower than the set pressures of the brake valves 28, 29. If the electromagnetic switching valve 46 is switched to the open position, pressure fluid introduced to the rotation motor RM flows into the joint passage 43 and is supplied to the assist motor AM via the safety valve 48 and the connection passage 42.

The controller C controls the tilting angle of the assist motor AM in accordance with a pressure signal from the pressure sensor 47. This control is as follows.

Unless the pressure in the passage 26 or 27 is kept at a pressure necessary for the rotating operation or the braking operation, it becomes impossible to rotate the rotation motor RM or apply braking.

Accordingly, to keep the pressure in the passage 26 or 27 at the rotation pressure or the brake pressure, the controller C controls a load of the rotation motor RM while controlling the tilting angle of the assist motor AM. That is, the controller C controls the tilting angle of the assist motor AM so that the pressure detected by the pressure sensor 47 becomes substantially equal to the rotation pressure of the rotation motor RM or the brake pressure.

If the assist motor AM obtains a rotational force, this rotational force acts on the coaxially rotating electric motor MG. The rotational force of the assist motor AM acts as an assist force for the electric motor MG. Accordingly, power consumption of the electric motor MG can be reduced by the rotational force of the assist motor AM.

The rotational force of the sub-pump SP can also be assisted by the rotational force of the assist motor AM. In this case, the assist motor AM and the sub-pump SP exhibit a pressure conversion function together.

That is, the pressure of the fluid flowing into the connection passage 42 is invariably lower than a pump-discharged pressure. To maintain a high discharge pressure of the sub-pump SP by utilizing this low pressure, a boosting function is exhibited by the assist motor AM and the sub-pump SP.

That is, an output of the assist motor AM is determined by a product of a displacement volume Q1 per rotation and a pressure P1 at that time. An output of the sub-pump SP is determined by a product of a displacement volume Q2 per rotation and a discharge pressure P2. Since the assist motor AM and the sub-pump SP are coaxially rotated in this embodiment, $Q1 \times P1 = Q2 \times P2$ has to hold. Accordingly, if the displacement volume Q1 of the assist motor AM is set, for example, to be three times as much as the displacement volume Q2 of the sub-pump SP, i.e. $Q1=3Q2$, the above equation is $3Q2 \times P1 = Q2 \times P2$. If the both sides of this equation are divided by Q2, $3P1=P2$ holds.

Accordingly, the sub-pump SP can be maintained at a predetermined discharge pressure by the output of the assist motor AM by changing the tiling angle of the sub-pump SP and controlling the displacement volume Q2. In other words, the fluid can be discharged from the sub-pump SP after boosting the fluid pressure from the rotation motor RM.

The tiling angle of the assist motor AM is so controlled as to keep the pressures in the passages 26, 27 at the rotation pressure or the brake pressure. Thus, the tilting angle of the assist motor AM is inevitably determined in the case of utilizing the fluid from the rotation motor RM. To exhibit the pressure conversion function with the tiling angle of the assist motor AM determined, the tilting angle of the sub-pump SP is controlled.

If a pressure in the connection passage 42, the joint passage 43 or the like falls below the rotation pressure or the brake pressure due to a certain cause, the controller C closes the electromagnetic switching valve 46 in accordance with a pressure signal from the pressure sensor 47 so that the rotation motor RM is not affected.

If there is a fluid leak in the connection passage 42, the safety valve 48 functions so that the pressures in the passages 26, 27 do not decrease more than necessary, thereby preventing runaway of the rotation motor RM.

Next, a case is described where the boom cylinder BC is controlled by switching the control valve 14 and the control valve 3 of the first circuit system in association with the control valve 14.

If the control valve 14 and the control valve 3 associated therewith are switched to actuate the boom cylinder BC, the sensor 14a detects an operating direction and an operated amount of the control valve 14 and an operation signal is input to the controller C.

In accordance with the operation signal of the sensor 14a, the controller C determines whether an operator is trying to raise or lower the boom cylinder BC. If a signal for raising the boom cylinder BC is input to the controller C, the controller C keeps the proportional electromagnetic valve 34 in the normal state, in other words, keeps the proportional electromagnetic valve 34 at the fully open position. In this case, the controller C keeps the electromagnetic on-off valve 50 at the shown closed position and controls the rotation speed of the electric motor MG and the tilting angle of the sub-pump SP to ensure a predetermined discharge amount from the sub-pump SP.

If a signal for lowering the boom cylinder BC is input to the controller C from the sensor 14a, the controller C calculates a lowering speed of the boom cylinder BC required by the operator according to the operated amount of the control valve 14, closes the proportional electromagnetic valve 34 and switches the electromagnetic on-off valve 50 to the open position.

If the proportional electromagnetic valve 34 is closed and the electromagnetic on-off valve 50 is switched to the open position, all the return fluid of the boom cylinder BC is supplied to the assist motor AM. However, if the flow rate consumed by the assist motor AM is lower than a flow rate necessary to maintain the lowering speed required by the operator, the boom cylinder BC cannot maintain the lowering speed required by the operator. In this case, the controller C controls the opening of the proportional electromagnetic valve 34 to return a flow rate equal to or higher than that consumed by the assist motor AM to the tank T based on the operated amount of the control valve 14, the tilting angle of the assist motor AM, the rotation speed of the electric motor MG and the like and maintains the lowering speed of the boom cylinder BC required by the operator.

If fluid is supplied to the assist motor AM, the assist motor AM rotates. The rotational force of the assist motor AM acts on the coaxially rotating electric motor MG. The rotational force of the assist motor AM acts as an assist force for the electric motor MG. Accordingly, power consumption can be reduced by the rotational force of the assist motor AM.

It is also possible to rotate the sub-pump SP only by the rotational force of the assist motor AM without supplying power to the electric motor MG. In this case, the assist motor AM and the sub-pump SP exhibit the pressure conversion function.

If the operator suddenly returns the control valves 3, 14 to the neutral positions to suddenly stop a lowering movement of the boom cylinder BC with the electromagnetic on-off valve 50 switched to the open position, the electromagnetic on-off valve 50 may not be able to follow, thereby causing a switching delay.

If there is a switching delay in the electromagnetic on-off valve 50, much of the return oil of the boom cylinder BC flows into the connection passage 42. Since the pressure of the return oil acts on the regulator 36, the displacement volume per rotation of the assist motor AM can be reduced and the torque thereof can be suppressed to or below the absorption torque of the electric motor MG.

Since the torque of the assist motor AM is suppressed to or below the absorption torque of the electric motor MG, the pressure of the boom cylinder BC increases to increase the braking action, wherefore there is no likelihood of runaway. A controlling distance can be shortened and the operation of the operator does not cause a sense of incongruity.

It may take some time until the assist motor AM lowers the displacement volume thereof. In this case, the pressure in the connection passage 42 somewhat increases. However, since the relief valve 52 is so set as to simultaneously exhibit a relief function, the torque of the assist motor AM does not increase to or above the absorption torque of the generator due to a switching delay of the electromagnetic on-off valve 50.

Figure 3:
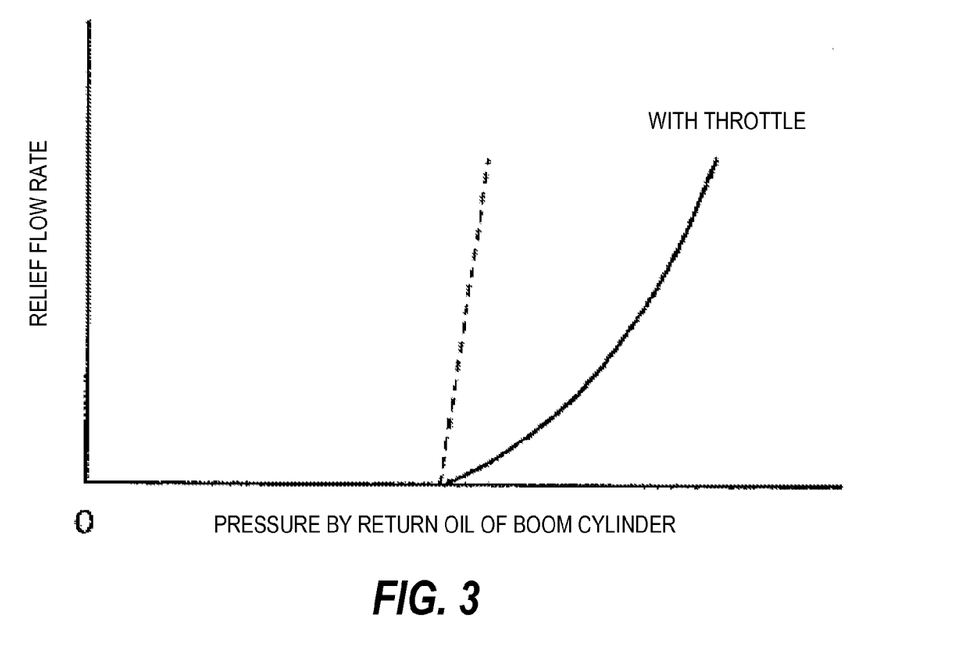
FIG. 3 is a graph showing a relationship between relief flow rate of a relief valve and pressure by the return oil of the boom cylinder.

Further, since the pressure override of the relief valve 52 is substantially worsened by the throttle 53, a braking force can be increased for the boom cylinder BC without any shock.

Next, a case is described where the rotating operation of the rotation motor RM and the lowering operation of the boom cylinder BC are simultaneously performed.

In the case of lowering the boom cylinder BC while rotating the rotation motor RM, the fluid from the rotation motor RM and the return fluid from the boom cylinder BC are joined in the connection passage 42 and supplied to the assist motor AM.

As the pressure in the connection passage 42 increases, the pressure in the joint passage 43 also increases. Even if this pressure becomes higher than the rotation pressure of the rotation motor RM or the brake pressure, the rotation motor RM is not affected since the check valves 44, 45 are provided.

If the pressure in the connection passage 42 becomes lower than the rotation pressure or the brake pressure, the controller C closes the electromagnetic switching valve 46 in accordance with a pressure signal from the pressure sensor 47.

Accordingly, in the case of simultaneously performing the rotating operation of the rotation motor RM and the lowering operation of the boom cylinder BC, the tilting angle of the assist motor AM may be determined based on a required lowering speed of the boom cylinder BC regardless of the rotation pressure or the brake pressure.

In any case, the output of the sub-pump SP can be assisted by that of the assist motor AM and the flow rate discharged from the sub-pump SP can be proportionally distributed by the first and second proportional electromagnetic throttle valves 40, 41 and supplied to the first and second circuit systems.

In the case of using the electric motor MG as a generator using the assist motor AM as a drive source, the electric motor MG can exhibit a power generation function utilizing the output of the assist motor AM if a substantially no-load state is set by zeroing the tilting angle of the sub-pump SP and the assist motor AM maintains an output necessary to rotate the electric motor MG.

In this embodiment, it is possible to generate power by the generator 22 utilizing the output of the engine E and by the electric motor MG utilizing the assist motor AM. The generated power is stored in the battery 24. However, since the battery 24 can be charged utilizing the household power supply 25 in this embodiment, the power of the electric motor MG can be obtained in various ways.

In this embodiment, the assist motor AM can be rotated utilizing the fluid from the rotation motor RM and the boom cylinder BC, and the sub-pump SP and the electric motor MG can be assisted by the output of the assist motor AM. Thus, energy loss until regenerative motive power is utilized is suppressed to a minimum level.

Since the output of the electric motor MG can be controlled according to the working state from the light working state to the heavy working state, the output of the electric motor MG can be relatively reduced particularly in light work such as ground leveling. Accordingly, battery consumption can be reduced and the life of the battery can be extended by as much as power consumption is reduced.

In some cases, a charge capacity of a battery to be mounted can be reduced to make the battery smaller.

The embodiment of the present invention has been described above. The above embodiment is merely illustration of one application example of the present invention and not of the nature to specifically limit the technical scope of the present invention to the above embodiment.

The present application claims a priority based on Japanese Patent Application No. 2010-29345 and Japanese Patent Application No. 2010-72560 filed with the Japanese Patent Office on Feb. 12, 2010 and Mar. 26, 2010, all the contents of which are hereby incorporated by reference.

INDUSTRIAL APPLICABILITY

Application to hybrid construction machines such as power shovels is possible.

The invention claimed is:

1. A control system for hybrid construction machine, comprising:
a variable-capacity main pump;
a circuit system which is connected to the main pump and includes a plurality of control valves;
a regulator which controls a tilting angle of the main pump;
a pilot flow path which is provided in the circuit system and introduces a pilot pressure generated when any one of the plurality of control valves is switched to the regulator;
an electric motor;
a variable-capacity sub-pump which is connected to a discharge side of the main pump and driven by an output power of the electric motor;
a regulator which is provided in the sub-pump and controls a tilting angle of the sub-pump;
a pressure sensor which is provided in the pilot flow path and detects the pilot pressure; and
a controller which is connected to the pressure sensor, controls the regulator of the sub-pump in accordance with a pressure signal from the pressure sensor, detects an output of the main pump and controls the output power of the electric motor according to the output of the main pump based on a table stored beforehand.

2. The control system according to claim 1, wherein:
the controller filters an output control value output based on the table and controls the output power of the electric motor based on the filtered output control value.

3. The control system according to claim 1, wherein:
the table holds output control values corresponding to from heavy work to light work; and
the controller determines whether work is heavy work or light work according to the output of the main pump and controls the electric motor based on the output control value corresponding to a working state.

4. A control system for hybrid construction machine, comprising:
a variable-capacity main pump;
a circuit system which is connected to the main pump and includes a plurality of control valves;
a regulator which controls a tilting angle of the main pump;
a pilot flow path which is provided in the circuit system and introduces a pilot pressure generated when any one of the plurality of control valves is switched to the regulator;
an electric motor;
a variable-capacity sub-pump which is connected to a discharge side of the main pump and driven by an output of the electric motor;
a regulator which is provided in the sub-pump and controls a tilting angle of the sub-pump;
a pressure sensor which is provided in the pilot flow path and detects the pilot pressure; and
a controller which is connected to the pressure sensor, controls the regulator of the sub-pump in accordance with a pressure signal from the pressure sensor, detects an output of the main pump and controls the output of the electric motor according to the output of the main pump based on a table stored beforehand, wherein:
the table holds output control values which correspond to each of a heavy working state, a light working state and an intermediate working state between the heavy working state and the light working state, and
the controller determines whether a current work state is the heavy working state, the light working state or the intermediate working state according to the output of the main pump and controls the electric motor based on the output control value corresponding to the current working state.

5. The control system according to claim 4, wherein the output of the electric motor is an output power of the electric motor.

* * * * *

UNITED STATES PATENT AND TRADEMARK OFFICE
CERTIFICATE OF CORRECTION

| | |
|---|---|
| PATENT NO. | : 8,655,558 B2 |
| APPLICATION NO. | : 13/512863 |
| DATED | : February 18, 2014 |
| INVENTOR(S) | : Haruhiko Kawasaki et al. |

It is certified that error appears in the above-identified patent and that said Letters Patent is hereby corrected as shown below:

Title Page:

Item (22), should read:

(22) PCT Filed: Feb. 7, 2011

Signed and Sealed this
Third Day of June, 2014

Michelle K. Lee
*Deputy Director of the United States Patent and Trademark Office*